Dec. 9, 1969    E. P. PERCARPIO ET AL    3,482,430
PORTABLE REBOUND OR SKID RESISTANCE TESTER
Filed Dec. 5, 1966

INVENTORS
EDWARD P. PERCARPIO
EDWARD M. BEVILACQUA
BY
Henry Sternberg
ATTORNEY

United States Patent Office 3,482,430
Patented Dec. 9, 1969

3,482,430
PORTABLE REBOUND OR SKID RESISTANCE TESTER
Edward P. Percarpio, North Haledon, and Edward M. Bevilacqua, Allendale, N.J., assignors to Uniroyal, Inc., New York, N.Y., a corporation of New Jersey
Filed Dec. 5, 1966, Ser. No. 599,076
Int. Cl. G01n *3/62, 3/52, 3/00*
U.S. Cl. 73—12
16 Claims

ABSTRACT OF THE DISCLOSURE

A portable rebound test apparatus comprising a spherical weight means which rolls along the interior of an arcuate tubular guide means to impact the surface of a material being tested, the degree of rebound of the spherical weight means being proportional to the resilient characteristics of the material under test.

---

The present invention relates to an apparatus for testing the resiliency of a material, and particularly of rubber products such as automobile tires, by measuring the rebound of a freely moving weight striking against a surface portion of the material to be examined.

Known resiliency testing devices fall basically into two categories. First, there are the swinging weighted pendulum devices in which a weight supported at the end of a wire or a swivable rod is swung toward and into engagement with a vertical surface of a test piece and the rebound is measured. In the second category are vertical-tube hardness testers which must be positioned accurately vertically with respect to a horizontal surfaces of a test piece in order to measure the height of vertical rebound of a weight dropped onto the horizontal surface. Presently, known devices are either relatively complicated, expensive, heavy pieces of equipment or they are inaccurate and subject to influence by changing atmospheric conditions. The first mentioned pendulum type of test device is, of course, most advantageously used only with a test sample having a vertically situated surface, while the second type of device, i.e., the vertical tube device is, of course, limited solely to use with test samples having a horizontally positioned surface. Where alternative use with horizontally disposed as well as vertically disposed test surfaces is desired, two different test devices are normally required, since the aforesaid devices are not interchangeably usable. The several accurate resiliency testing devices of the prior art have also not proven entirely satisfactorily for the reason that they are complicated in design and construction, expensive to manufacture, difficult to use, and usually require that the work piece be brought to the instrument.

With the foregoing in view, the primary object of the present invention is to provide a simple, small, compact, lightweight, easily transportable and accurate resiliency measuring device.

Another object of the invention is to provide a device of the aforesaid type which may be used not only in the laboratory but may be used also in the field, and the accuracy of which will not be influenced by normal environment changes.

A further object of the invention is to provide a device which is sufficiently versatile so that it may be used at will with a vertical as well as with a horizontally disposed test sample surface.

Still another object of the present invention is to provide a device having the aforesaid characteristics which is capable of measuring an important property of rubber products without disassembling or removing them from the structure to which they are attached.

A concomitant object of the present nivention is to provide an apparatus of the above type which may be used effectively to test relatively thin as well as thick materials.

A still further object of the present invention is to provide an apparatus having the above characteristics and which is in the form of a hand tool which can be carried in the pocket of the operator and which is so simple to operate that it requires little or no special skills.

Further objects and advantages of this invention will become apparent as the following description proceeds.

While the specification concludes with claims particularly pointing out and distinctly claiming the subject matter of this invention, it is believed that the invention will be better understood from the following description, taken in conjunction with the accompanying drawings, in which:

Figure 1:
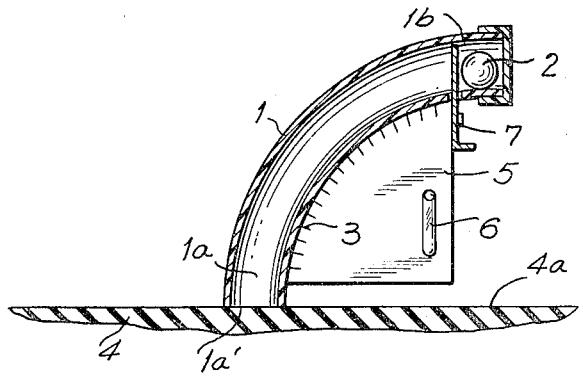
FIG. 1 is a front elevational view of the apparatus according to the present invention showing the same in test position on a horizontally disposed test surface.

Referring now to the drawing wherein like numerals refer to like or corresponding parts throughout the several views, the resiliency testing apparatus disclosed therein to illustrate the invention comprises a stationary guide means in the form of a curved tube 1 having an open end portion 1a and a spaced second end portion 1b. The tube 1 is preferably made of transparent plastic material or glass for easy viewing therethrough and preferably extends along a quadrant of an ellipse or a circle. A frame means 5 is illustrated substantially in the form of a 90° sector to which the tube 1 is fixedly connected in the region of the arcuate portion of the sector periphery. Also carried by the frame means 5, inwardly of the tube 1, is a scale means 3 of arcuate shape corresponding to the curvature of the tube 1. The scale markings may be calibrated to be indicative of the percent rebound or any other useful measure of the resiliency characteristics of the material being tested.

Figure 2:
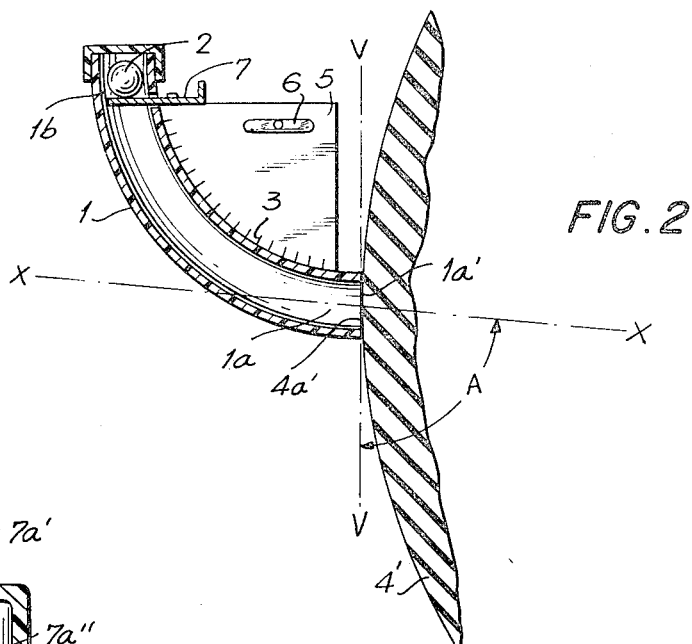
FIG. 2 is a front elevational view of the device according to FIG. 1 illustrating the same in position for testing the resiliency characteristics of a vertically disposed surface portion of an automobile tire tread.

A weight means, preferable in the form of a steel ball 2, is located within the tube 1 and is normally held in position at the end portion 1b of the tube by a releasable holding means shown in the form of a sliding tab 7 which may be mounted on frame 5, as seen in FIGS. 1 and 2, so that one portion thereof can be slid into and out of a position in the interior of the tube, respectively obstructing and releasing the ball 2. Other forms of releasable holding means may, of course, also be used. For example, where ball 2 consists of ferromagnetic material, a permanent magnet may be positioned at the exterior of tube 1 in the region of end portion 1b thereof and movable, with respect to the ball 2, into and out of magnetically attracting condition therewith.

Figure 3:
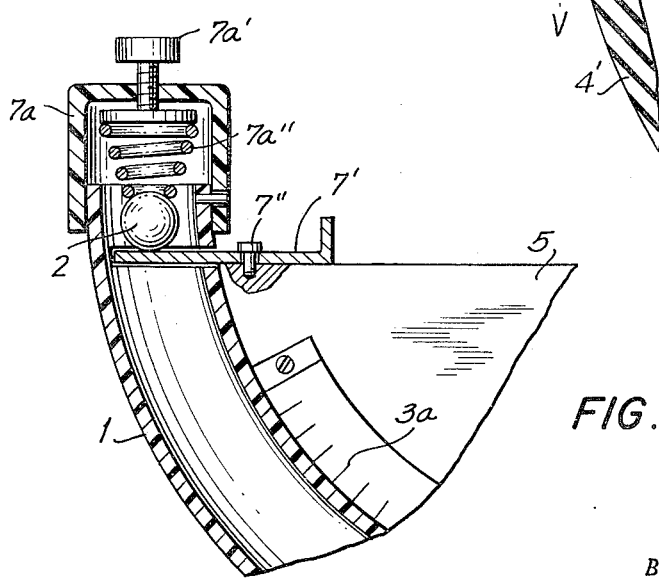
FIG. 3 is a partial cross-sectional elevation illustrating in somewhat larger scale a slightly modified version of the apparatus according to FIGS. 1 and 2.

The releasable holding means illustrated in FIG. 3 is in the form of a tab 7' pivoted for turning movement about pivot 7" fixed to frame 5. The portion of tab 7' located at the interior of tube 1 is movable out of the path of ball 2 through, for example, a transverse slot in the wall of tube 1.

The modified releasable holding means illustrated in FIG. 3 further adjustable resilient means in the form of a coil spring 7a" one end of which is adapted to engage the surface of a ball 2 retained in place by tab 7', while the other end of the spring is connected to an end portion of the adjusting screw member 7a'. Rotation of the screw member 7a' with respect to the tube 1, of course, adjusts the spring tension applied by spring 7a″ and thus is a means for adjusting the initial velocity with which the ball member 2 is released upon operation of the manually operable releasable holding tab 7′. An end member 7a is provided to retain the spring 7a″ and screw 7a′ in place at the end of tube 1. A bayonet joint (not shown) may be provided between end member 7a and tube 1 so that the assembly 7a, 7a′, 7a″ may be readily removed or axially displaced for return of ball 2 into holding position. A scale means 3a, calibrated for use with an initial velocity imparting arrangement such as illustrated in FIG. 3, may be screwed to, or in any other convenient way fixedly mounted in position on, frame 5 whenever the spring arrangement 7a′, 7a″ is used.

A level-indicator means, which may be in the form of an air bubble device 6, is also secured to frame 5 in a position in which the axis of the liquid filled cylinder thereof is substantially normal to the plane of the end face 1a′ of end portion 1a. The bubble of the level-indicator will therefore be centered in the liquid filled cylinder thereof when, as seen in FIG. 2, the end face 1a′ of the tube is in face to face abutment with a vertically disposed test surface, i.e., a surface located in a vertical plane. The test sample 4′ having a surface portion 4a′ located in a vertical plane V—V as seen in FIG. 2, may for example be a portion of an automobile tire in position on an automobile. While the end face 1a′ of tube 1 may be located in a plane which is substantially normal to the axis of the tube, in the region of such end portion, it is preferred, particularly when the apparatus is to be used for measurement of vertically disposed surfaces, that the tangent x—x, i.e., the tangent line drawn to the curved axis of tube 1 at the point of intersection of such axis with the plane of the edge face 1a′, makes with such plane an angle of slightly less than 90°. Angle A is preferably approximately 84 to 86° so that tangent x—x will be inclined approximately 4–6° downwardly with respect to the horizontal, when the device is placed in operating position as seen in FIG. 2. This insures that only resiliency of the rubber drives the ball back up the tube, and that a stably reproducible reading will be obtained when a vertical surface is being tested without errors introduced by the effect of gravity.

In use, the apparatus may be placed onto a horizontally disposed surface 4a of a test material 4, with the edge face 1a′ in face to face abutment with surface 4a, and with the tube 1 located substantially in a vertical plane normal to the plane of the horizontal surface 4a. The tube 1 has a smooth internal surface whose diameter exceeds the diameter of ball 2 so that the latter may freely roll therein. When the operator activates the releasable holding means 7, ball 2 descends under the influence of gravity along the arcuate path defined by the interior of tube 1, rolling down the inside of the tube in a practically frictionless manner from the spaced end portion 1b to the lower open end portion 1a to impact with the material 4. After impact, the ball 2 rebounds along the arcuate path a distance which is proportional to the resilient properties of the test material 4. This amount of rebound of the ball 2 along the scale 3 is read by the operator and, since the ball used is relatively small, e.g., 0.187″ in diameter and thus relatively light even though a steel ball may be used, will be indicative of the resilient properties of the surface layer of the material being tested. As previously noted the scale 3 may be calibrated in terms of percent rebound or in a scale based on a property depending on resiliency. Both the downward movement and the upward rebound movement of the ball 2 are practically frictionless, since only point contact between the ball 2 and the internal surface of the tube 1 will take place.

When the apparatus is used as seen in FIG. 2, to test a material having a vertically disposed surface portion, the device is once again oriented so that the tube 1 will be located in a vertical plane substantially normal to the test surface plane 4a′. The ball 2 is releasably held in end portion 1b at an elevation above that of end portion 1a. When face to face abutment with a perfectly vertical surface is attained, the level-indicator bubble will be in a central indicating position.

The apparatus, when used in connection with vertically disposed test surfaces, is normally supported by the operator who may conveniently hold the frame and tube assembly in one hand while actuating the manual releasable holding means 7 with the other hand. If the test surface is not perfectly vertical, face to face abutment between the end face 1a′ of the tube and the test surface will not result in a level reading of the bubble of the indicator level 6. For best results the apparatus may then be tilted slightly until the indicator level bubble reaches its level indicator reading even though this results in a slight inclination of the edge face of the tube with respect to the plane of the test surface.

Upon actuation by the operator of the releasable holding means 7, the ball 2 is free to roll along the arcuate path defined by the internal surface of tube 1 into contact with the vertical test surface 4a′ of the test piece 4′ which latter may be, for example, an automobile tire still mounted on the axle of an automobile. The rebound along the arcuate path defined by the tube may be determined by the operator by observing the maximum position of the ball 2 along the scale means 3.

While scale means 3 is illustrated as an independent part it may, alternatively, consist of graduations marked directly on the surface of the arcuate tube 1. It would, of course, also be possible to provide the device with any one of a multitude of known maximum rebound measuring arrangements, which could, for example, include magnetic or electrical devices to move a pointer or other rebound indicating means to a position indicative of the maximum ball rebound displacement position reached. As illustrated in FIG. 2, ball 2 will, when used with a vertical test surface, roll from a higher elevation in the region of end portion 1b to the lower elevation of end portion 1a where it impacts with the test material, to thereafter rebound a measurable amount.

Considering for a moment the test arrangement illustrated in FIG. 2, it will be seen that if the amount of rebound of the ball along the arcuate tube were measured in purely "vertical" direction it would be identical with the reading achieved with a straight vertical tube, i.e., if the ball were released for straight vertical fall from the same height and would rebound purely vertically. The accuracy of the rebound read-out is, however, vastly improved as a result of the scale "magnification" produced by the curved shape of the tube. Upon rebound from the vertical test surface, ball 2 initially travels along a shallow, substantially horizontal, curved path, thus providing substantial scale magnification for the same vertical distance traversed. In other words, when rebounding back along the arcuate path defined by the tube, the ball will reach substantially the same vertical height as it would if rebounding vertically upwardly in a straight vertical tube, however, the curved rebound path of the ball is necessarily longer than the straight vertical rebound dimension and thus provides a greatly "magnified" and therefore much more accurate rebound measurement than would otherwise be possible. This is particularly important in the case of resiliency measurement of elastomeric, e.g., rubber or rubber-like, materials since the amount of rebound is quantatively substantially less with such materials than that normally expected when testing the hardness of, e.g., a metal or other similarly non-elastic material.

It has been found that the wet skid resistance of automobile tires, i.e., the locked-wheel stopping distance of an automobile on a wet surface, or the coefficient of friction of other elastomeric articles, is related to the resiliency characteristic of the surface portion of the tire tread material or other elastomeric article which can be measured with the rebound tester according to the present invention. The scale 3 may, therefore, be calibrated to be indicative of, for example, wet skid resistance in the case of tire testing. By using a relatively small and therefore relatively light steel ball, the deformation of the material is minimized so that a true indication of the characteristics of the surface portion of the test piece is attainable.

The rebound test apparatus according to the present invention is small, compact, easily transportable and accurate. The device is relatively simple and therefore inexpensive to produce and to operate. Since it comprises primarily a curved tube and a freely moveable ball weight, the apparatus is substantially unaffected by atmospheric conditions. Normal atmospheric changes will not affect the accuracy of the device nor is the device limited to use in laboratories since neither sensitive handling, nor large testing apparatus is required. Its operation is as accurate out-of-doors in a strong breeze as it would be in the confines of a laboratory.

Because of the size of the indenter used, it gives reliable and reproducible readings from specimens as thin as 0.02″. It can therefore be used readily in the field or on odd-shaped pieces. No other apparatus known to us is as sensitive.

The small penetration which the ball makes on the test specimen gives a rate and a depth of deformation of the test specimen very close to that occurring in rubber tires under wet road conditions. The device can therefore be fitted, for example, with a scale calibrated to be indicative of resistance to skidding rather than percent rebound, and which can be read with great accuracy.

While it is preferred that the tube 1 be constructed of transparent material, it is of course only necessary that one longitudinal wall portion be transparent. Or, if opaque material is used, a slot extending axially of the tube and permitting viewing of the ball therein, would suffice.

Solely for purpose of illustration it is noted that the following ball and tube dimensions have been found to operate satisfactorily. With a frame of ⅛ inch rigid plastic plate in the form of a quadrant of a circle having a 3 inch radius, there was used a transparent plexi-glass tube having a radius of curvature of approximately 3 inches. The tube was fixed to the frame so as to project at end face 1a' approximately ¹⁄₁₆ inch beyond the frame edge. The ball consisted of steel, and the angle A was approximately 85°. The tube and scale may be connected to the frame with cement or by other connecting means such as screws, straps, etc. The entire device weighs less than 1½ ounces when constructed as set forth above.

While the preferred form of this invention has been described herein, it will be understood that changes in details thereof may be made without departing from the spirit of this invention, and it is intended to cover all those changes which come within the scope of the appended claims.

Having thus described the invention, what is claimed as new and desired to be protected by Letters Patent is:

1. An apparatus for testing the resilient properties of a material comprising, in combination:
   an arcuate tubular guide means having an internal surface;
   a spherical weight means received in the interior of said guide means and arranged to roll along said internal surface so as to impact with the rebound from the surface of a material being tested when one end of said tubular guide means is adjacent said surface of said material being tested.
   said weight means being adapted to roll along said arcuate interior surface of said guide means between a first position in which said weight means is vertically spaced from the surface being impacted and a second position in which said weight means is adjacent to said surface being impacted; and
   indicia means cooperating with said spherical weight means for providing an indication of the amount of rebound of said weight means.

2. An apparatus according to claim 1, wherein said indicator means includes a scale means located along said arcuate path.

3. An apparatus according to claim 1, wherein said weight means comprises a ball having a diameter at least slightly smaller than the internal diameter of said tubular guide means 4. An apparatus according to claim 1, wherein said arcuate tubular guide means extends along substantially a quadrant of a circle.

5. An apparatus according to claim 1, wherein said tubular guide means has at least one open end portion adapted to be placed against a surface of the material to be tested.

6. An apparatus according to claim 1, wherein said tubular guide means has at least one transparent side for viewing said weight means during rebound thereof.

7. An apparatus according to claim 5, further comprising manually operable releasable holding means carried by said tubular guide means in the region of the other end portion thereof for releasably holding said weight means in said first position spaced from the material being tested.

8. An apparatus according to claim 7, wherein said manually operable holding means includes resilient means for imparting to said weight means an initial velocity when the latter is released by said manually operable holding means.

9. An apparatus according to claim 8, wherein said resilient means includes an adjustable spring which engages said weight means when the latter is held by said holding means, said spring urging said weight means in a direction toward said open end of said tube.

10. An apparatus according to claim 1, further comprising frame means supporting said tubular means, the latter being shaped to extend substantially along a quadrant of a circle; and said indicia means including arcuate scale means also supported by said frame means and extending adjacent to said tubular means.

11. An apparatus according to claim 10, wherein said scale means comprises graduation indicative of the wet skid resistance of an automobile tire.

12. An apparatus according to claim 1, further comprising level second indicator means carried by said frame means for determining the position of said tubular means in which said other end portion thereof is located at a predetermined vertical level above said one end portion thereof.

13. A small, compact, easily transportable, accurate rebound test apparatus for determining resiliency characteristics of elastomeric materials comprising, in combination,
   a spherical weight member having a smooth outer surface;
   curved guide tube means defining at the interior thereof an arcuate passage for guiding said spherical member of the substantially frictionless rolling movement there-along,
   said guide tube means having at least one open end portion adapted to be placed against the surface of the material to be tested;
   releasable holding means positioned in the region of the other end position of said tube means for releasably holding said weight member at a given vertical height above said one end portion when said apparatus is in operating position with said other end portion so that, when released, said weight member will roll under the influence of gravity toward said open end of said tube means and into engagement with the surface of the test material to thereafter rebound along said arcuate passage a distance indicative of the resilient properties of the material being tested; and indicia means associated with said guide tube means for providing an indication of the amount of said rebound of said weight member.

14. An apparatus according to claim 13, wherein said weight member comprises a ball received with play in the interior of said tube means, said guide tube means extending substantially along one quadrant of a circle, and located in a substantial vertical plane when said end face is placed against a vertical surface of the material being tested so that the vertical displacement of said ball along the path defined by said passage and into engagement with said material will be substantially equal to the radius of said circle.

15. An apparatus according to claim 17, further comprising frame means carrying said tube means, said indicia means including scale means also carried by said frame means for indicating the position of said tube means at which a tangent drawn to the path of movement of said ball immediately before impact thereof will be inclined downwardly a predetermined relatively small amount.

16. An apparatus according to claim 15, wherein said level second indicator means is positioned and arranged so as to provide an indication when a line normal to the plane containing said end face of said tube means is slightly downwardly inclined with respect to the horizontal, said ball moving substantially parallel to said line at the moment of impact upon and rebound from said vertical surface of the material being tested.

References Cited
UNITED STATES PATENTS

| | | | |
|---|---|---|---|
| 1,057,850 | 4/1913 | Kirner | 73—79 |
| 1,781,615 | 11/1930 | Von Lessen | 73—79 |
| 2,207,502 | 7/1940 | Zamboni | 73—79 |
| 3,038,330 | 6/1962 | Criche | 73—79 |

RICHARD C. QUEISSER, Primary Examiner

JOHN K. LUNSFORD, Assistant Examiner

U.S. Cl. X.R.

73—79, 88

UNITED STATES PATENT OFFICE
CERTIFICATE OF CORRECTION

Patent No. 3,482,430                                  December 9, 1969

Edward P. Percarpio et al.

It is certified that error appears in the above identified patent and that said Letters Patent are hereby corrected as shown below:

Column 2, line 67, after "further" insert -- includes --. Column 5, line 64, "the", first occurrence, should read -- and --; line 67, "tested." should read -- tested, --. Column 6, line 7, after "means" insert a period; line 41, "graduation" should read -- graduations --; line 43, the claim reference numeral "1" should read -- 7 --; line 44, "level second" should read -- level-second --; line 57, "of the" should read -- for --; line 58, "there-along" should read -- therealong --; line 67, before "so" insert -- located at a higher elevation than said one end portion --. Column 7, line 11, claim reference numeral "17" should read -- 14 --; line 14, after "means" insert --  and extending lengthwise of said tube means, and level-second indicator means carried by said frame means --; line 20, "level second" should read -- level-second --.

Signed and sealed this 7th day of July 1970.

(SEAL)
Attest:

EDWARD M. FLETCHER, JR.                  WILLIAM E. SCHUYLER, JR.
Attesting Officer                            Commissioner of Patents